US011505660B2

(12) United States Patent
Veit et al.

(10) Patent No.: US 11,505,660 B2
(45) Date of Patent: Nov. 22, 2022

(54) FIBER REINFORCED MATERIALS WITH IMPROVED FATIGUE PERFORMANCE

(71) Applicant: Owens Corning Intellectual Capital, LLC, Toledo, OH (US)

(72) Inventors: Richard Veit, Rochefort (FR); Samuel Solarski, Wasquehal (FR)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 16/958,824

(22) PCT Filed: Jan. 4, 2019

(86) PCT No.: PCT/US2019/012249
§ 371 (c)(1),
(2) Date: Jun. 29, 2020

(87) PCT Pub. No.: WO2019/139822
PCT Pub. Date: Jul. 18, 2019

(65) Prior Publication Data
US 2021/0069995 A1 Mar. 11, 2021

(30) Foreign Application Priority Data

Jan. 9, 2018 (EP) ..................... 18305013

(51) Int. Cl.
 *C08J 5/04* (2006.01)
 *B29C 70/14* (2006.01)
(Continued)

(52) U.S. Cl.
 CPC ................. *C08J 5/04* (2013.01); *B29C 70/14* (2013.01); *B29C 70/508* (2013.01); *B32B 5/022* (2013.01);
(Continued)

(58) Field of Classification Search
 CPC ...... Y10T 428/31504; Y10T 442/3976; D03D 15/267; C08K 7/14; B29L 2031/7504;
(Continued)

(56) References Cited

U.S. PATENT DOCUMENTS 4,038,243 A 7/1977 Maaghul
5,445,693 A 8/1995 Vane
(Continued)

FOREIGN PATENT DOCUMENTS

CA 1062595 A1 9/1979
CN 201358359 Y 12/2009
(Continued)

OTHER PUBLICATIONS

Extended European Search Report from EP Application No. 18305013.7 dated May 28, 2018.
(Continued)

*Primary Examiner* — Camie S Thompson
(74) *Attorney, Agent, or Firm* — Calfee, Halter & Griswold LLP

(57) ABSTRACT

A fiber-reinforced fabric, composite materials formed from such fabrics, and methods of making the fiber-reinforced fabric or composite materials, are provided. The fabrics and composite materials demonstrate improved fatigue performance relative to conventional fiber-reinforced fabrics.

12 Claims, 3 Drawing Sheets

(51) Int. Cl.

| | | |
|---|---|---|
| *B29C 70/50* | (2006.01) | |
| *B32B 5/02* | (2006.01) | |
| *B32B 5/26* | (2006.01) | |
| *B32B 7/12* | (2006.01) | |
| *C08J 5/08* | (2006.01) | |
| *C08K 7/14* | (2006.01) | |
| *C08J 5/24* | (2006.01) | |
| *B29K 67/00* | (2006.01) | |
| *B29K 105/14* | (2006.01) | |
| *B29K 309/08* | (2006.01) | |
| *B29L 31/00* | (2006.01) | |

(52) U.S. Cl.
CPC ............... *B32B 5/26* (2013.01); *B32B 7/12* (2013.01); *C08J 5/08* (2013.01); *C08J 5/248* (2021.05); *C08K 7/14* (2013.01); *B29K 2067/00* (2013.01); *B29K 2105/14* (2013.01); *B29K 2309/08* (2013.01); *B29L 2031/7504* (2013.01); *B32B 2255/02* (2013.01); *B32B 2260/021* (2013.01); *B32B 2260/046* (2013.01); *B32B 2262/0276* (2013.01); *B32B 2262/101* (2013.01); *B32B 2603/00* (2013.01); *C08J 2367/00* (2013.01)

(58) Field of Classification Search
CPC ..... B29C 70/00; B29C 70/14; B29K 2105/14; C08L 63/00; B29B 11/16; B29B 15/122; B29B 15/12; C03C 25/1095; C03C 5/48; C03C 25/80; C03C 25/10; C03C 25/36; B32B 2260/021; B32B 2260/046; B32B 2262/101; B32B 5/26; B32B 5/02
USPC ......... 442/59, 50, 64, 65, 66, 108, 109, 172, 442/148, 208, 217, 209, 224, 238, 243, 442/251, 253, 254; 428/411.1, 299.1, 428/299.4, 299.7, 293.7, 297.4, 297.1, 428/298.1, 298.7, 200.1, 300.4, 340, 364, 428/370, 378, 375, 365
See application file for complete search history.

(56) References Cited

U.S. PATENT DOCUMENTS

| | | | |
|---|---|---|---|
| 5,809,805 | A | 9/1998 | Palmer et al. |
| 6,296,921 | B1 | 10/2001 | Blackmore et al. |
| 6,375,602 | B1 | 4/2002 | Jones |
| 7,354,875 | B2 | 4/2008 | Hand et al. |
| 7,435,693 | B2 | 10/2008 | Tsotsis et al. |
| 7,794,640 | B2 | 9/2010 | Healey et al. |
| 7,829,490 | B2 | 11/2010 | Li et al. |
| 3,067,317 | A1 | 11/2011 | Hand et al. |
| 8,234,990 | B2 | 8/2012 | Xie et al. |
| 8,246,882 | B2 | 8/2012 | Tsotsis |
| 8,450,222 | B2 | 5/2013 | Pritchard et al. |
| 8,563,449 | B2 | 10/2013 | Mueller et al. |
| 8,613,257 | B2 | 12/2013 | Wockatz |
| 8,697,590 | B2 | 4/2014 | Li et al. |
| 8,697,591 | B2 | 4/2014 | Li et al. |
| 8,852,713 | B2 | 10/2014 | Tsotsis |
| 9,056,786 | B2 | 6/2015 | Peters et al. |
| 9,096,462 | B2 | 8/2015 | Li |
| 9,156,728 | B2 | 10/2015 | Peters et al. |
| 9,290,661 | B2 | 3/2016 | Hupka et al. |
| 9,371,604 | B2 | 6/2016 | Wockatz |
| 9,394,196 | B2 | 7/2016 | Peters et al. |
| 9,427,943 | B2 | 8/2016 | Li et al. |
| 9,505,193 | B2 | 11/2016 | Bergstrom |
| 9,598,309 | B2 | 3/2017 | Li |
| 9,714,478 | B2 | 7/2017 | Bergstrom |
| 9,770,844 | B2 | 9/2017 | Moser et al. |
| 10,011,930 | B2 | 7/2018 | Adolphs et al. |
| 10,059,079 | B2 | 8/2018 | Kunal et al. |
| 10,683,592 | B2 | 6/2020 | Blackburn et al. |
| 2004/0043144 | A1 | 3/2004 | Carter et al. |
| 2004/0219855 | A1 | 11/2004 | Tsotsis |
| 2004/0241415 | A1 | 12/2004 | Wadahara et al. |
| 2005/0041312 | A1 | 2/2005 | Sommer et al. |
| 2005/0257887 | A1 | 11/2005 | Tsotsis |
| 2006/0121805 | A1 | 6/2006 | Krulic |
| 2008/0061464 | A1 | 3/2008 | Krulic |
| 2008/0289743 | A1 | 11/2008 | Tsotsis |
| 2009/0075544 | A1 | 3/2009 | Ruelle et al. |
| 2009/0252941 | A1 | 10/2009 | Mueller et al. |
| 2010/0028644 | A1 | 2/2010 | Xie et al. |
| 2013/0130584 | A1 | 5/2013 | Fujiwara et al. |
| 2015/0140306 | A1 | 5/2015 | Endo et al. |
| 2016/0033072 | A1 | 2/2016 | Mersmann et al. |
| 2016/0101592 | A1 | 4/2016 | Sauer et al. |
| 2016/0264453 | A1 | 9/2016 | Peters et al. |
| 2017/0100900 | A1 | 4/2017 | Moser et al. |

FOREIGN PATENT DOCUMENTS

| | | |
|---|---|---|
| CN | 201483839 U | 5/2010 |
| CN | 101293970 B | 7/2010 |
| CN | 201592536 U | 9/2010 |
| CN | 101302302 B | 2/2011 |
| CN | 101614182 B | 5/2011 |
| CN | 201817670 U | 5/2011 |
| CN | 201901752 U | 7/2011 |
| CN | 202192817 U | 4/2012 |
| CN | 101967729 B | 5/2012 |
| CN | 203004425 U | 6/2013 |
| CN | 203210695 U | 9/2013 |
| CN | 103509238 A | 1/2014 |
| CN | 103724813 A | 4/2014 |
| CN | 103174127 B | 10/2014 |
| CN | 203864123 U | 10/2014 |
| CN | 203919886 U | 11/2014 |
| CN | 204869886 U | 12/2015 |
| CN | 205000091 U | 1/2016 |
| CN | 205130530 U | 4/2016 |
| CN | 205167736 U | 4/2016 |
| CN | 205326404 U | 6/2016 |
| CN | 105818471 A | 8/2016 |
| CN | 106397802 A | 2/2017 |
| CN | 206085840 U | 4/2017 |
| CN | 106120078 B | 7/2017 |
| CN | 111764041 A | 10/2020 |
| EP | 3023241 A1 | 5/2016 |
| JP | 2015113539 A | 6/2015 |
| WO | 2015119984 A2 | 8/2015 |
| WO | 2017118619 A1 | 7/2017 |

OTHER PUBLICATIONS

International Search Report and Written Opinion from PCT Application No. PCT/US2019/012249 dated Mar. 26, 2019.
Leon Mishnaevsky Jr. et al., "Materials for Wind Turbine Blades: An Overview," Materials, vol. 10, No. 11, Nov. 9, 2017, 24 pages.
Office Action from IN Application No. 202037029146 dated Jan. 19, 2022.
Office Action from CN Application No. 201980007877.4 dated Mar. 9, 2022.
Office Action from RU Application No. 2020125204 dated Apr. 28, 2022.



FIBER REINFORCED MATERIALS WITH IMPROVED FATIGUE PERFORMANCE

CROSS-REFERENCE TO RELATED APPLICATIONS

This application is the U.S. national stage entry of PCT/US2019/012249, filed on Jan. 4, 2019, which claims priority to and all benefit of European Patent Application No. 18305013.7, filed on Jan. 9, 2018, the entire disclosures of which are fully incorporated herein by reference.

FIELD

The general inventive concepts described herein relate to fiber reinforced composite materials and, more particularly, to fabrics including reinforcement fibers with improved fatigue performance.

BACKGROUND

It is known to use fiber reinforced materials, such as fabrics, mats, veils, and the like to form structural components. Many reinforcement fabrics include lengthwise fibers (warp fibers) arranged side by side and substantially parallel to one another, along with cross-wise fibers (weft fibers). The weft fibers provide benefits in strength, handling of the fabric, and optionally, permeability of liquid components. When the fabric includes a significantly large amount of warp fibers (e.g., 90% or more) relative to the number of weft fibers, the fabric is often referred to as a unidirectional fabric.

As noted above, the fabric is useful for forming fiber-reinforced structural components. For example, the fabric can be stacked up or otherwise layered to form a spar cap of a blade of a wind energy turbine. In particular, several layers of fabric are arranged on top of each other to form a laminate-structural component. The fabric layers are arranged within specific areas and regions of a mold. An infusion process introduces a curable matrix material (a resin) into the mold in order to penetrate the layers of the fabric. A vacuum can be applied to the mold during the infusion process to press the layers together and aid the resin in penetrating the layers. Once sufficiently infused through the fabric, the resin is allowed to harden forming the structural component.

Components that employ such a fiber-reinforcement generally require high strength to weight ratios. For example, a spar cap of a blade of a wind energy turbine must withstand near constant stress from significant forces (e.g., wind, centripetal force) during its usable lifespan. Despite having a high strength to weight ratio, the fiber-reinforced components eventually shown signs of degrading (fatigue). Thus, there is a need for a fiber-reinforced component with improved fatigue performance.

SUMMARY

The general inventive concepts discussed herein are based, at least in part, on fabrics for manufacturing fiber-reinforced composite materials which demonstrate improved fatigue performance relative to conventional fiber-reinforced components. Generally, the inventive concepts discussed herein are based on the recognition that the initial signs of fatigue (and corresponding breakage of reinforcement fibers) occurs at the juncture of non-parallel fibers (e.g., warp and weft fibers) within a fiber-reinforced composite material.

In an exemplary embodiment, a fabric for reinforcing a composite material formed in combination with a resin, is provided. The fabric comprising first fibers and second fibers; wherein the first fibers are oriented parallel to one another; wherein the second fibers are oriented parallel to one another; wherein the second fibers are oriented perpendicular to the first fibers; and wherein a ratio of first fibers to the second fibers is 15:1 to 25:1. The fabric is characterized by the first fibers including a first sizing and the second fibers including a second sizing, the first sizing being compatible with the resin and the second sizing being incompatible with the resin.

In an exemplary embodiment, a composite material comprising a fabric and a resin is provided. The fabric is comprised of first fibers and second fibers; the first fibers are oriented in a substantially parallel orientation and the second fibers are oriented in a substantially perpendicular orientation to the first fibers and a ratio of first fibers to second fiber is 15:1 to 25:1. In certain embodiments, the first fibers include a first sizing and the second fibers include a second sizing.

In an exemplary embodiment, a method of making a composite material, is provided. The composite material is formed from a fabric and a resin, wherein the fabric comprises first fibers and second fibers. The method comprising applying a first sizing to the first fibers; applying a second sizing to the second fibers; positioning the first fibers in a parallel first arrangement; positioning the second fibers in a parallel second arrangement, wherein the first arrangement is perpendicular to the second arrangement, and wherein the ratio of first fibers to second fibers is 15:1 to 25:1; infusing the fabric with the resin; curing the resin to form the composite material; wherein the first sizing is compatible with the resin and the second sizing is incompatible with the resin.

Numerous other aspects, advantages, and/or features of the general inventive concepts will become more readily apparent from the following detailed description of exemplary embodiments and from the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
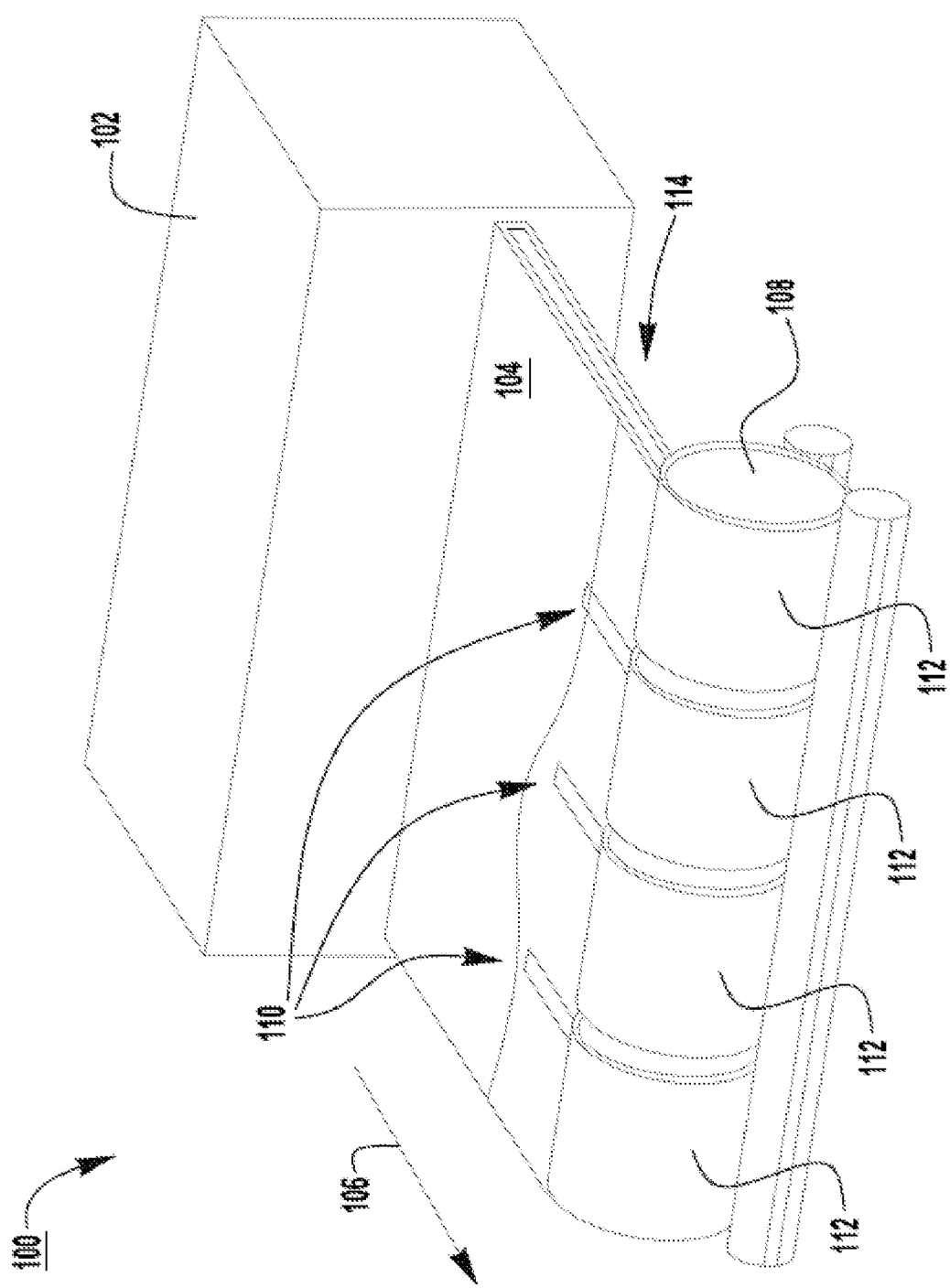
FIG. 1 shows a system for forming a fiber-reinforced fabric.

Several illustrative embodiments will be described in detail to provide a better understanding of the invention.

Wind power and the use of wind turbines have gained increased attention as the quest for alternative energy sources continues. Wind power is considered by many to be a clean and environmentally friendly energy source. With an increasing attention towards generating more energy from wind power, technological advances in the art have allowed for increased sizes of wind turbines and new designs of wind turbine components. However, as the physical sizes and availability of wind turbines increase, so does the need to design components that balance high strength-to-weight ratios and long component lifespan to further allow wind power to be cost-competitive with other energy sources.

The size, shape, and weight of the turbine blades contribute significantly to the cost and energy efficiencies of wind turbines. An increase in blade size and decrease in blade weight generally increases the energy efficiency of a wind turbine. However, increasing the size of the blade also contributes to additional forces associated with operation of the turbine. This increase in forces leads to increased strain and fatigue on the components of the blade which, in turn, decreases the lifespan of the blade.

The structural makeup of a wind turbine blade is comprised of a matrix, often a cured resin, and a reinforcement material. The reinforcement material is comprised of a fibrous fabric. Reinforcement fibers used in the manufacture of materials for wind turbine blades include glass fibers and carbon fibers. It is known in the art that bare glass fibers are not compatible with many common resins. That is, the resin will not cure to form a bond with the glass. The resulting composite material will include both materials, but without a strong bond between the two materials, the composite rill not perform as well. This issue is overcome by applying a "sizing" to the glass prior to exposing the glass to the resin.

The sizing is a chemical composition (often a liquid) that is applied to the surface of the glass during production of glass fibers. The sizing may serve many purposes, one of which being to form a chemical "bridge" between the resin and the surface of the glass, making the two chemically compatible with one another and facilitating bonding between the resin and the glass which, in turn, will form a stronger composite material. Thus, a sizing will include chemical functional groups, one of which interacts with the glass, and another that interacts with the resin. However, because individual resins may include different chemical functional groups, the sizing must be compatible with the particular resin functional groups to form a significant bond thereto.

The term "compatible" as used herein refers to the chemical interaction between two individual components, namely a sizing composition and a resin. In particular, the term compatible refers to a scenario wherein a chemical sizing applied to a glass fiber is capable of bonding with (e.g., crosslinking with) a resin during curing to form a composite material or structural component. In contrast, a sizing that is not compatible with a particular resin is one which will not bond or otherwise crosslink with that resin during curing thereof. One example of a non-compatible sizing is the use of a thermoplastic sizing with a polyester resin, or vice versa.

The invention is based, at least in part, on the dual discoveries that 1) fatigue and breakage in the fibers that reinforce wind turbine blades first occurs at the interface between warp fibers and weft fibers in a fabric, and 2) this breakage is greatly reduced if one of the fiber orientations (typically, the weft fibers) does not include a sizing that is compatible with the particular type of resin used to form the matrix of the wind turbine blade.

A conventional system 100 for forming a structural component made from a composite material, in this case a spar cap of a wind turbine blade, will be described with reference to FIGS. 1-3. In the system 100, a machine 102 continuously produces a fiber reinforced material in the form of an in infusible fabric 104. Preferably, the fabric is a nonwoven (crimp-free) fabric. The fabric includes 1) warp fibers which make up approximately 95% or more of the total fibers in the fabric and which are oriented in a lengthwise direction and 2) weft fibers which make up the remainder of the reinforcement fibers in the fabric and which are oriented in a substantially perpendicular direction relative to the warp fibers (i.e., 80° to 90° relative to the warp fibers). In certain embodiments, the warp fiber is a higher tex (e.g., >1200 tex) and the cross-fiber (weft) is a low tex fiber (e.g., <600 tex). The weft fibers are woven through or otherwise laid across the warp fibers to provide benefits in handling and resin infiltration during manufacture of a composite material (e.g., the spar cap). In many applications, the machine 102 will use a stitching yarn to hold the reinforcement fibers together and substantially fix their positions relative to one another. The stitching yarn is applied in a predetermined pattern and at a predetermined stitching length. In some instances, a fabric complex could be formed by also stitching multiple layers of the fabric 104 together with any other related structure (e.g., a carrier layer), either within the machine 102 or downstream thereof.

As noted above, the fabric 104 includes or is otherwise reinforced with warp fibers (e.g., glass and/or carbon fibers) that extend substantially along a length of the fabric 104 (i.e., parallel to the arrow 106). As the fabric 104 exits the machine 102 and travels in a direction indicated by the arrow 106, the fabric 104 is wound at a roll area 108. A winder or other conveying means pulls the fabric 104 from the machine 102 to the roll area 108. Blades or other cutting means form slits 110 in the fabric 104 prior to the roll area 108. In this manner, discrete rolls 112 of the fabric 104 are formed.

Once a predetermined quantity of the fabric 104 has been wound to the roll area 108, a manual cut 114 is made across the width of the fabric 104, thereby separating the rolls 112 from the fabric 104 exiting the machine 102. When it is time to form the spar cap, one or more rolls 112 are moved into proximity to a mold 128 used to form the spar cap. As noted above, the spar cap is formed by layering, such as by hand laying, a number of cut pieces of the fabric 104 from the rolls 112. The number and placement of the cut pieces within the mold 128 define the properties (e.g., shape, thickness) of the spar cap.

Figure 2:
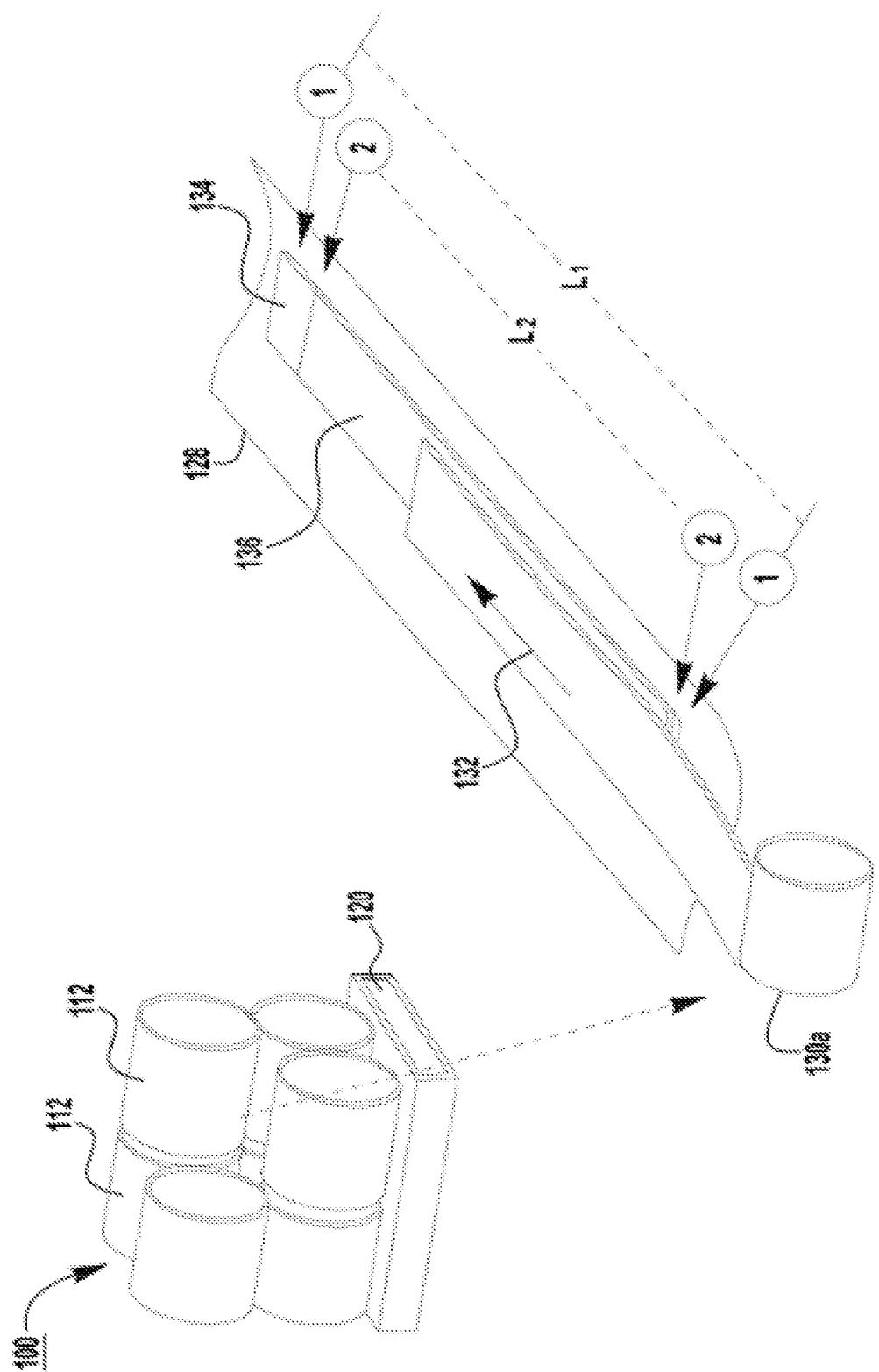
FIG. 2 illustrates the production of a fiber reinforced fabric for a composite material.

As shown in FIG. 2, a first roll 130a of the fabric 104 is taken off a pallet 120 and cut into pieces of desired lengths to be placed in the mold 128. In particular, a first quantity of the fabric 104 is unrolled in the direction of arrow 132 and then cut to form a first piece 134 of length $L_1$ represented by the dashed line 1-1. Next, a second quantity of the fabric 104 is unrolled in the direction of arrow 132 and then cut to form a second piece 136 of length $L_2$ represented by the dashed line 2-2. As lines 1-1 and 2-2 indicate, the length $L_1$ of the first piece 134 is greater than the length $L_2$ of the second piece 136. While some cut pieces may have the same length, many of the cut pieces will have different lengths. Each successive cut piece is positioned on or otherwise overlapped with the preceding cut pieces. Typically, many cut pieces (e.g., 50 or more) are required. This process is repeated until a desired thickness and shape is obtained within the mold 128. Finally, resin is introduced into the mold, such as by an infusion process, and cured to form the spar cap.

With this background in mind, the invention relates to use of a fabric involving first fibers (i.e., the fibers of the warp direction) with a sizing applied thereto that is different in chemical compatibility to the sizing applied to second fibers (i.e., the fibers in the weft direction). This is a departure from conventional techniques in so far as the general intention of fiber-reinforced composite materials is to maximize the strength to weight ratio and, it follows that increasing the amount of bonding between the resin and all of the fibers would be expected to increase the strength of the fiber-reinforced composite material.

Accordingly, in certain embodiments, the general inventive concepts relate to a fabric comprising first fibers and second fibers, the first fibers comprise a first sizing that is compatible with a resin and the second fibers include a second sizing that is not compatible with the resin. In certain exemplary embodiments, the general inventive concepts relate to a composite material comprised of a resin and a fabric, the fabric comprising first fibers and second fibers, the first fibers include a first sizing that is compatible with a resin and the second fibers include a second sizing that is not compatible with the resin.

In certain embodiments, the matrix resin is comprised of a resin selected from: epoxy resins, polyester resins, vinylester resins, polyurethane resins, a bio-based resin, a liquid thermoplastic resin, and a styrene-free resin.

Accordingly, in certain exemplary embodiments, a first sizing that is compatible with a matrix resin, is applied to the first fibers while a second sizing that is not compatible with the matrix resin is applied to the second fibers. Typically, the first fibers are warp fibers and the second fibers are weft fibers. In certain exemplary embodiments, the matrix resin is a polyester resin, the first sizing is a polyester-compatible sizing, and the second sizing is selected so as not to be compatible with the matrix resin. For example, if the resin is a polyester resin and the first sizing is compatible with the resin (i.e., is a polyester-compatible sizing) the second sizing could be a sizing compatible with at least one of the following: epoxy resins, vinylester resins, polyurethane resins, a bio-based resin, and a styrene-free resin, so long as the second sizing is not compatible with the polyester resin. In certain exemplary embodiments, the resin is a polyester resin, the first sizing is compatible with the polyester resin, and the second sizing is compatible with a thermoplastic resin.

In certain exemplary embodiments, the invention relates to a method of making a composite material. The composite material is formed from a fabric and a resin, wherein the fabric comprises first fibers and second fibers. The method comprises: applying a first sizing to the first fibers; applying a second sizing to the second fibers; positioning the first fibers parallel to one another in a first arrangement, positioning the second fibers parallel to one another in a second arrangement; wherein the first arrangement is perpendicular to the second arrangement to form a fabric; infusing the fabric with the resin; and curing the resin to form the composite material. In certain exemplary embodiments, the first sizing is compatible with the resin and the second sizing is not compatible with the resin.

Use of an incompatible sizing is expected to prevent or minimize the interaction between the resin and the fibers having the incompatible sizing (i.e., the weft fibers). While not wishing to be bound by theory, Applicant believes that this lack of interaction or bonding between the resin and the weft fibers will, in turn, lead to a more flexible interface between the warp and weft fibers, which will postpone the appearance of initial cracking at the fiber intersection. This in turn will extend the usable lifespan of the wind turbine blade.

The invention encompasses a unidirectional fabric. The fabric includes first fibers and second fibers. The first fibers include a first sizing applied thereto, and are present in an amount of at least 95% of the total fibers in the fabric. The second fibers include a second sizing, are oriented in a substantially perpendicular arrangement relative to the first fibers, and are present in an amount of 5% or less of the total fibers in the fabric. The first sizing is compatible with a resin (e.g., a polyester resin) and the second sizing is not compatible with the resin.

In certain exemplary embodiments, the fabric also comprises a stitching yarn in addition to the first and second fibers. More specifically, the stitching yarn is used to hold the first and second fibers together, while also substantially fixing their relative positions within the fabric. In some exemplary embodiments, the stitching yarn might also be used to connect multiple layers of the fabric together to form a (unidirectional) fabric complex.

Figure 3:
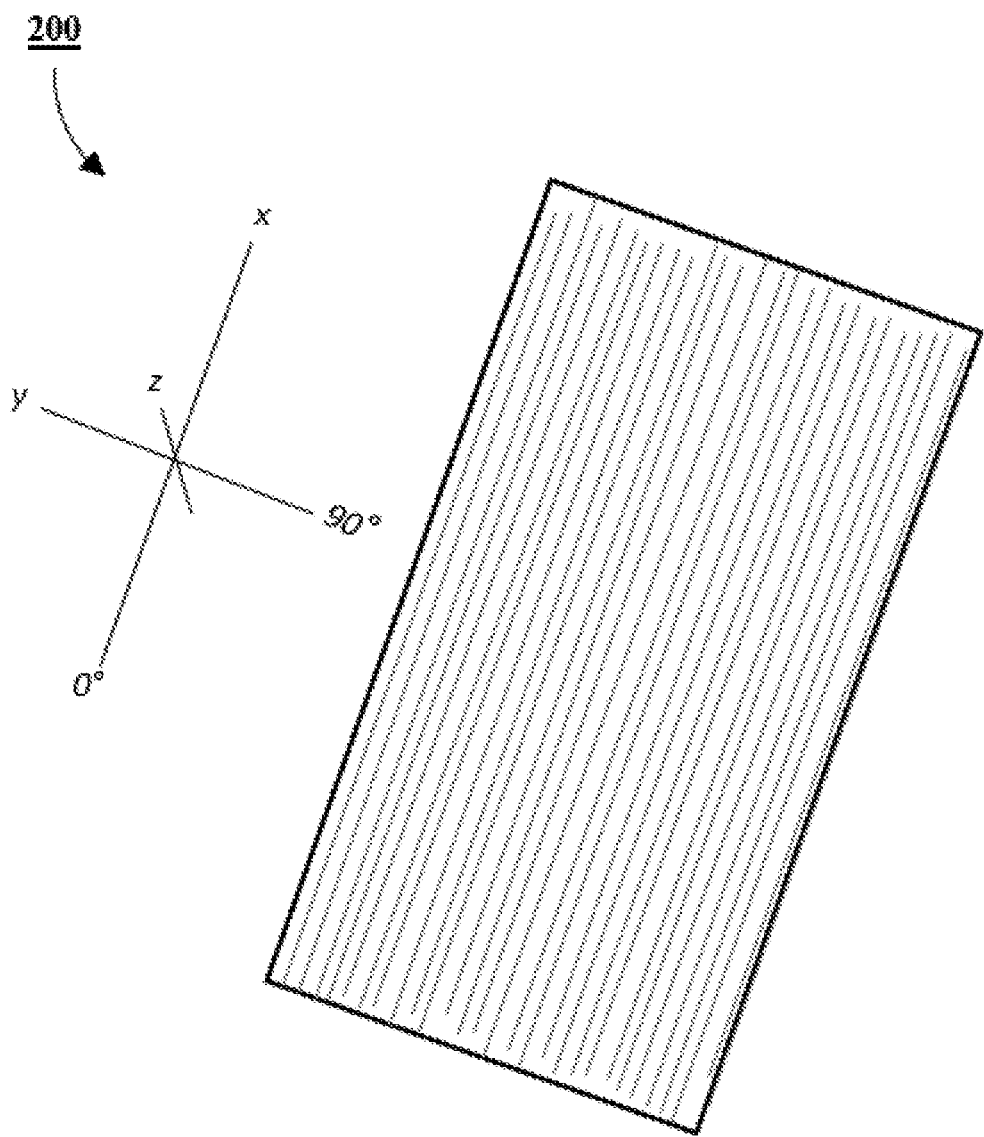
FIG. 3 shows the fiber arrangement in an exemplary fabric.

An exemplary fabric 200 is shown in FIG. 3. The fabric 200 is a unidirectional fabric comprising many (e.g., hundreds, thousands) of reinforcement fibers 202 that are substantially aligned with one another. In general, approximately 95% or more of the fibers 202 are orie in the longitudinal (0°) direction parallel to the x-axis (i.e., warp fibers), while approximately 5% or fewer of the fibers 202 are oriented in another direction between 45° and 90° (i.e., weft fibers). In certain exemplary embodiments, the weft fibers are oriented at approximately 90° to the warp fibers, i.e., parallel to the y-axis.

The reinforcement fibers are stitched together using a stitching yarn wherein the stitching yarn extends through the fabric to interface with the reinforcement fibers from both above and below.

EXAMPLES

The following paragraphs describe and demonstrate exemplary embodiments of the fiber-reinforced fabrics and composite materials made therefrom. The exemplary embodiments are provided solely for the purpose of illustration and are not to be construed as limitations of the present disclosure, as many variations thereof are possible without departing from the spirit and scope of the present disclosure. The fiber-reinforced fabrics and composite materials may be prepared in accordance with the methods described herein.

Two unidirectional fabrics were assembled. Both including weft fibers arranged at approximately 90° relative to the warp fibers. The first fabric was made using warp fibers having a polyester compatible sizing applied to both the warp fibers and the weft fibers. The second fabric was made using a polyester compatible sizing applied to the warp fibers and a thermoplastic compatible sizing (i.e., a sizing not compatible with polyester resins) applied to the weft fibers. Composite materials were made with each of the fabrics using a polyester resin (i.e., both of the fibers in the first fabric were compatible with the resin, whereas only the warp fibers of the second fabric were compatible with the resin) and the same stitching yarn (here, a stitching yarn having multi-filaments and tex between 70 dtex and 150 dtex). The two composites were tested for strain at 1 MM cycles. The results are shown in Table 1.

TABLE 1

| Weft Angle | Sizing | Resin | Fiber Weight Factor | Strain at 1 MM Cycle | Strain at 73% FWF |
|---|---|---|---|---|---|
| ±90° | Polyester | Polyester | 73.5% | 0.46 | 0.48 |
| ±90° | Thermoplastic | Polyester | 73.2% | 0.58 | 0.59 |

As can be seen in Table 1, the composite material made from the fabric having weft fibers with a sizing that was incompatible with the resin demonstrated improved fatigue performance relative to the composite made using the fabric wherein both warp and weft fibers were compatible with the resin.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The composite materials, structural components, and corresponding manufacturing methods of the present disclosure can comprise, consist of, or consist essentially of the essential elements and limitations of the disclosure as described herein, as well as any additional or optional components, or limitations described herein or otherwise useful in fiber-reinforced composite materials.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another (e.g., one or more of the exemplary embodiments may be utilized in combination with each other). Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described.

The invention claimed is:

1. A fabric for reinforcing a composite material formed in combination with a resin, the fabric comprising first fibers and second fibers;
   wherein the first fibers are oriented parallel to one another; wherein the second fibers are oriented parallel to one another; wherein the second fibers are oriented perpendicular to the first fibers; and
   wherein a weight ratio of first fibers to the second fibers is 15:1 to 25:1;
   wherein the fabric is characterized by the first fibers including a first sizing and the second fibers including a second sizing, the first sizing being compatible with the resin and the second sizing being incompatible with the resin.

2. The fabric of claim 1, wherein the first fibers and second fibers are glass fibers.

3. The fabric of claim 1, wherein the composite material is comprised of a plurality of layers of the fabric.

4. The fabric of claim 1, wherein the resin is selected from: an epoxy resin, a polyester resin, a vinylester resin, a polyurethane resin, a bio-based resin, and a styrene-free resin.

5. The fabric of claim 1, wherein the resin is a polyester resin.

6. The fabric of claim 5, wherein the first sizing is compatible with the polyester resin and the second sizing is compatible with a non-polyester thermoplastic resin.

7. A method of making a composite material, the composite material formed from a fabric and a resin, wherein the fabric comprises first fibers and second fibers; the method comprising:
   applying a first sizing to the first fibers;
   applying a second sizing to the second fibers;
   positioning the first fibers in a parallel first arrangement, positioning the second fibers in a parallel second arrangement, wherein the first arrangement is perpendicular to the second arrangement, and wherein a weight ratio of first fibers to second fibers is 15:1 to 25:1;
   infusing the fabric with the resin;
   curing the resin to form the composite material;
   wherein the first sizing is compatible with the resin and the second sizing is incompatible with the resin.

8. The method of claim 7, wherein the first fibers and second fibers are glass fibers.

9. The method of claim 7, further comprising positioning at least two layers of the fabric to form a laminate prior to infusing the fabric with the resin.

10. The method of claim 7, wherein the resin is selected from: epoxy resins, polyester resins, vinylester resins, polyurethane resins, a bio-based resin, and a styrene-free resin.

11. The method of claim 7, wherein the resin is a polyester resin.

12. The method of claim 11, wherein the first sizing is compatible with the polyester resin and the second sizing is compatible with a non-polyester thermoplastic resin.

* * * * *